(12) United States Patent
Wang

(10) Patent No.: US 10,207,800 B2
(45) Date of Patent: Feb. 19, 2019

(54) HELICOPTER ANTI-TORQUE ROTOR

(71) Applicant: LEONARDO S.p.A., Rome (IT)

(72) Inventor: James Wang, Samarate (IT)

(73) Assignee: Leonardo S.p.A., Rome (IT)

( * ) Notice: Subject to any disclaimer, the term of this patent is extended or adjusted under 35 U.S.C. 154(b) by 178 days.

(21) Appl. No.: 15/501,076

(22) PCT Filed: Aug. 7, 2015

(86) PCT No.: PCT/IB2015/056031
§ 371 (c)(1),
(2) Date: Feb. 1, 2017

(87) PCT Pub. No.: WO2016/020900
PCT Pub. Date: Feb. 11, 2016

(65) Prior Publication Data
US 2017/0253328 A1    Sep. 7, 2017

(30) Foreign Application Priority Data
Aug. 8, 2014   (EP) .................................... 14425106

(51) Int. Cl.
*B64C 27/00* (2006.01)
*B64C 27/82* (2006.01)
(Continued)

(52) U.S. Cl.
CPC .............. *B64C 27/82* (2013.01); *B64C 27/68* (2013.01); *B64C 27/78* (2013.01); *B64C 27/54* (2013.01); *B64C 27/58* (2013.01); *B64C 27/59* (2013.01)

(58) Field of Classification Search
CPC ......... B64C 27/54; B64C 27/58; B64C 27/59; B64C 27/68; B64C 27/78; B64C 27/82
See application file for complete search history.

(56) References Cited

U.S. PATENT DOCUMENTS 2,529,635 A   11/1950  Sikorsky et al.
2,699,833 A   1/1955   Jensen
(Continued)

FOREIGN PATENT DOCUMENTS

GB   2149372 A   6/1985

OTHER PUBLICATIONS

International Application No. PCT/IB2015/056031, International Search Report and Written Opinion of the International Searching Authority, dated Oct. 26, 2015 (13 pages).
(Continued)

*Primary Examiner* — Richard G Davis
(74) *Attorney, Agent, or Firm* — McDonnell Boehnen Hulbert & Berghoff LLP

(57) ABSTRACT

An anti-torque rotor of a helicopter, having: a supporting body; a drive shaft which rotates about a first axis with respect to the supporting body; a hub connected operatively to drive shaft and angularly fixed with respect to first axis; at least one blade which is connected operatively to hub, is angularly fixed with respect to first axis, and is angularly movable with respect to a second axis to adjust the pitch angle of blade; and an actuator which can be operated to rotate blade about second axis to adjust the pitch angle of blade; actuator has an electric motor which generates torque along the first axis; and a mechanical stage interposed between the electric motor and blade, and designed to convert the torque into rotation of blade about the respective second axes; electric motor is fixed to supporting body.

6 Claims, 6 Drawing Sheets

(51) Int. Cl.
    *B64C 27/68*     (2006.01)
    *B64C 27/78*     (2006.01)
    *B64C 27/54*     (2006.01)
    *B64C 27/58*     (2006.01)
    *B64C 27/59*     (2006.01)

(56) References Cited

U.S. PATENT DOCUMENTS

| | | |
|---|---|---|
| 4,555,219 A | 11/1985 | Jeffery et al. |
| 5,607,122 A | 3/1997 | Hicks et al. |

OTHER PUBLICATIONS

International Application No. PCT/IB2015/056031, International Preliminary Report on Patentability, dated Jul. 27, 2016 (18 pages).

100
HELICOPTER ANTI-TORQUE ROTOR

CROSS-REFERENCE TO RELATED APPLICATIONS

This application is a National Stage Application of International Patent Application No. PCT/IB2015/056031, filed Aug. 7, 2015, which claims the benefit of, and priority to, European Patent Application No. 14425106.3, filed Aug. 8, 2014, the contents of these applications being incorporated entirely herein by reference.

TECHNICAL FIELD

The present invention relates to a helicopter anti-torque rotor.

BACKGROUND ART

Helicopters are known comprising a fuselage; a main rotor fitted to a top centre portion of the fuselage; and an anti-torque tail rotor for counteracting the torque transmitted from the main rotor to the fuselage.

Anti-torque tail rotors substantially comprise:
a drive shaft which rotates about a first axis;
a hub connected operatively to the drive shaft so as to also rotate about the first axis; and
a number of blades which rotate integrally with the hub about the first axis, project from the hub, and extend along respective second axes crosswise to the first axis.

The blades are thus rotated about the first axis integrally with the drive shaft and the hub.

The blades are also fitted to the hub to rotate about their respective second axes to adjust their pitch angles with respect to the airflow, and so adjust the lift generated by the blades and hence the thrust generated by the anti-torque rotor.

In one known solution, the helicopter comprises:
a pilot-operated pedal inside the cockpit defined by the fuselage of the helicopter;
a rod movable along the first axis and connected operatively to the blades to rotate the blades by equal angles about the respective second axes and so adjust the lift generated by the anti-torque rotor; and
a mechanism which connects the pedal operatively to the end of the rod on the opposite side to the blades, and is traversed by mechanical pulses produced by impulsive operation of the pedal by the pilot.

The helicopter also comprises a hydraulic actuator controlled by the mechanical pulses through the mechanism, and designed to supply the mechanical pulses, amplified in force, to the end of the rod.

The hydraulic actuator comprises:
a hydraulic servo-actuator controlled by the mechanical pulses and comprising a cylinder defining chambers filled with pressurized oil, and a piston that slides along a third axis crosswise to the first axis;
a first linkage which converts translation of the piston along the third axis to translation of the rod along the first axis; and
a second linkage which converts translation of the rod along the first axis to rotation of the blades about the respective second axes.

More specifically, the hydraulic servo-actuator is fixed to a transmission group which is operatively connected to the rotor, and the first and second linkage are housed partly inside the fuselage and partly inside the anti-torque rotor.

Though satisfactory as regards correct adjustment of the blade pitch angles, the solution described still leaves room for improvement.

In particular, the known hydraulic actuator described comprises a large number of component parts, and is therefore complicated to produce, assemble and maintain.

This is substantially due to the mechanism being housed partly inside the fuselage and partly inside the anti-torque rotor of the helicopter.

A need is therefore felt within the industry for a helicopter anti-torque rotor comprising an actuator that is easy to produce, assemble and maintain.

A need is also felt within the industry to maximize as far as possible the precision and repeatability with which the blade pitch angles are adjusted, so as to improve control of the anti-torque rotor and manoeuvrability of the helicopter as a whole.

The actuator described also inevitably results in fouling inside the anti-torque rotor, mainly due to the hydraulic motor oil supply and the need to keep it pressurized. Managing this pressurized oil generates a need for frequent maintenance and for the disposal of that oil.

A need is therefore felt within the industry to adjust the blade pitch angles of the anti-torque rotor, while at the same time minimizing fouling by the actuator.

U.S. Pat. No. 2,387,617 and US2010/012309 disclose helicopters with anti-torque rotors equipped with fixed pitch angle blades and rotated by an electric motor.

U.S. Pat. No. 8,464,980 discloses using an electric motor to rotate a anti-torque rotor drive shaft.

US2009/0140095 discloses using an electric motor to rotate a helicopter anti-torque rotor.

US2013/0264412 discloses using an electric motor to rotate the drive shaft; and adjusting means interposed functionally between the electric motor and the anti-torque rotor, and designed to adjust the rotor blade pitch angles. The adjusting means comprise a memory unit and a computing unit.

U.S. Pat. No. 4,555,219 discloses a X-wing aircraft having only one rotor with four blades.

GB-A-2149372 discloses a helicopter comprising a first and a second coaxially mounted rotors and without any anti-torque tail rotor. The first rotor comprises a first main shaft and two first blades driven in rotation by the first main shaft. The second rotor comprises a second main shaft, which is mounted coaxially with the first main shaft and two second blades driven in rotation by the second shaft.

The helicopter further comprises, for each first and second rotor:
an electric motor;
a first additional shaft which is axially movable upon the action of the electric motor, angularly fixed and is connected by a first linkage to an end of the first blade; and
a second additional shaft which is axially movable upon the action of the electric motor, is angularly fixed and is connected by a second linkage to an end of the second blade.

The first additional shaft, the second additional shaft and the relative main shaft are coaxially mounted.

U.S. Pat. No. 2,699,833 discloses a helicopter with a main rotor and an anti-torque tail rotor with blades having relative variable pitch angles. The helicopter further comprises a main motor for controlling the main rotor, and an auxiliary motor operated in response to the main rotor or through the pedals and adapted to adjust the pitch angles of the blades of the anti-torque tail rotor.

The auxiliary motor is arranged outside the anti-torque tail rotor.

DISCLOSURE OF INVENTION

It is an object of the present invention to provide a helicopter designed to meet at least one of the above demands cheaply and easily.

According to the present invention, there is provided a helicopter according to claim 1.

BRIEF DESCRIPTION OF THE DRAWINGS

Two preferred embodiments of the present invention will be described by way of example with reference to the attached drawings, in which.

BEST MODE FOR CARRYING OUT THE INVENTION

Figure 1:
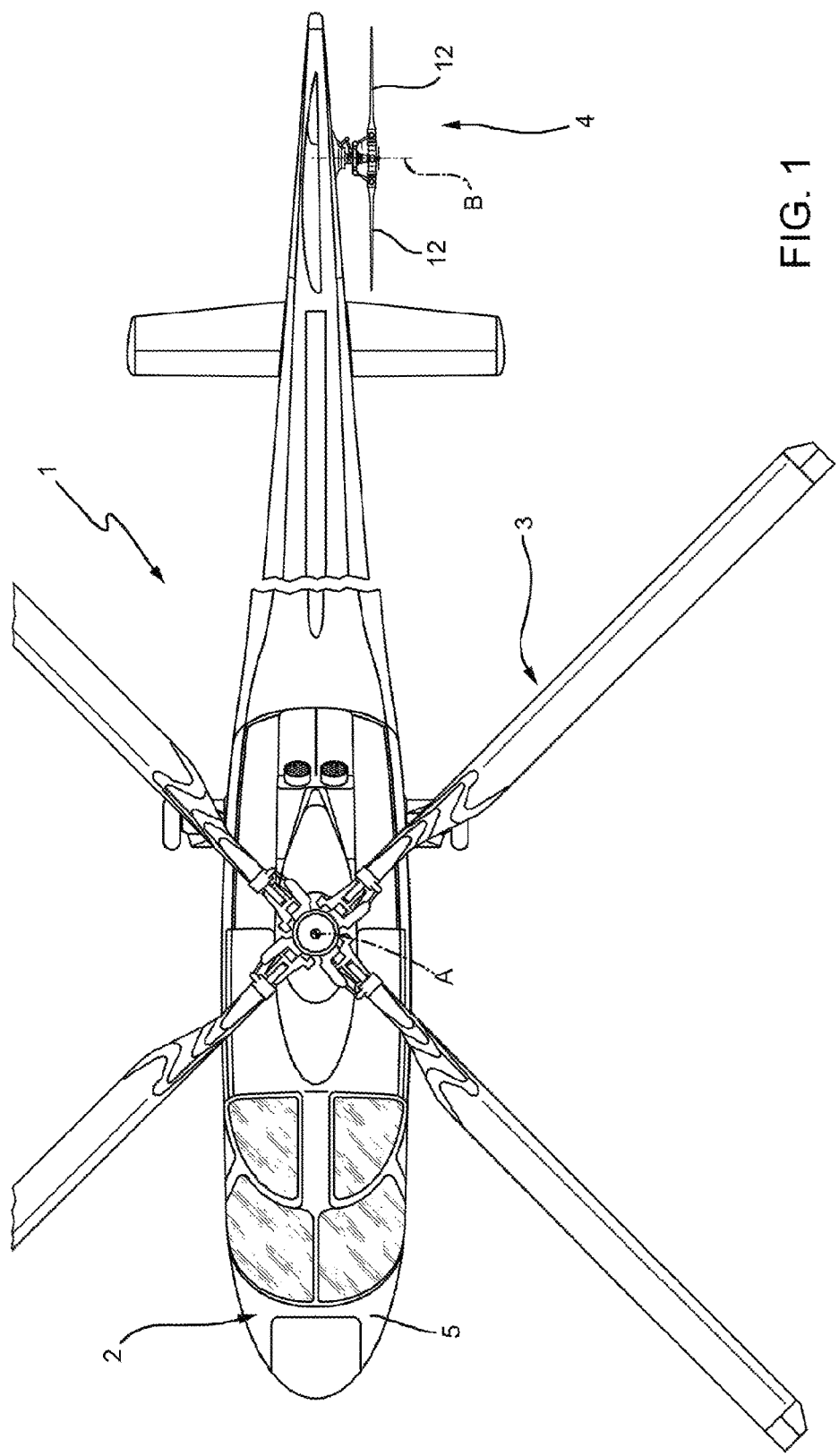
FIG. 1 shows a top plan view of a helicopter in accordance with the present invention and with an anti-torque rotor.

Number 1 in FIG. 1 indicates a helicopter substantially comprising a fuselage 2 with a nose 5; a main rotor 3 fitted to the top of fuselage 2 and rotatable about an axis A; and an anti-torque tail rotor fitted to a fin projecting from fuselage 2 at the opposite end to nose 5.

More specifically, main rotor 3 provides helicopter 1 with the lift to raise it, and the thrust to move it forward, while rotor 4 exerts force on the fin to generate a straightening torque on fuselage 2. The straightening torque balances the torque exerted on fuselage 2 by main rotor 3, and which would otherwise rotate fuselage 2 about axis A.

Rotor 4 substantially comprises (FIGS. 2 to 5):
a drive shaft 10 which rotates about an axis B crosswise to the axis of rotation A of main rotor 3;
a hub 11 fixed angularly with respect to shaft 10 about axis B; and
two blades 12 which project from hub 11, on opposite sides of axis B, are fixed angularly with respect to hub 11 about axis B, and are fitted to hub 11 to rotate about respective axes D to adjust their respective pitch angles with respect to the outside airflow.

More specifically, blades 12 extend lengthwise along respective axes D, which, in the example shown, lie along a straight line crosswise to axis B.

In the example show, rotor 4 is a so-called "teetering rotor", i.e. hub 11 can oscillate with respect to shaft 10 about an axis orthogonal to axes B, D, so as to allow blades 12 to flap.

In the example shown, shaft 10 is hollow. Each blade 12 also comprises (FIGS. 2 to 5):

a root 13a radially close to axis B and connected to hub 11; and
an elongated body 13b extending parallel to respective axis D and located on the opposite side of root 13a to hub 11 and axis B.

Rotor 4 also comprises:
a supporting body 14 connected, in a manner not shown, to fuselage 2 and fixed with respect to axis B;
a drive 15 (FIGS. 3 and 4) for transmitting drive torque from an engine (not shown) to shaft 10, and so rotating hub 11 and blades 12 about axis B; and
an actuator 16 which is operated to rotate blades about respective axes D and so adjust the pitch angles of blades 12.

Figure 2:
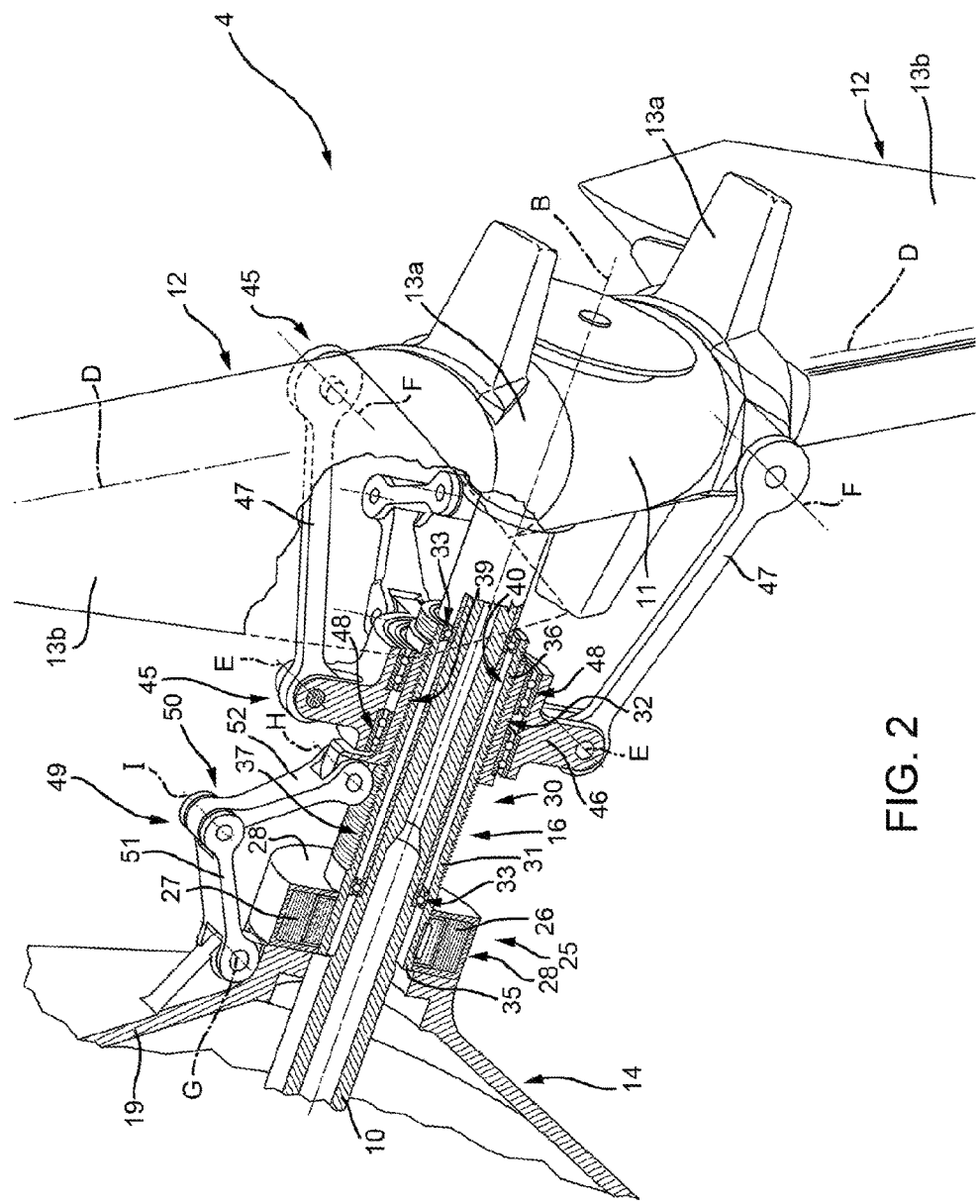
FIG. 2 shows a partly sectioned, larger-scale view in perspective, with parts removed for clarity, of a first embodiment of the FIG. 1 helicopter anti-torque rotor.
Figure 3:
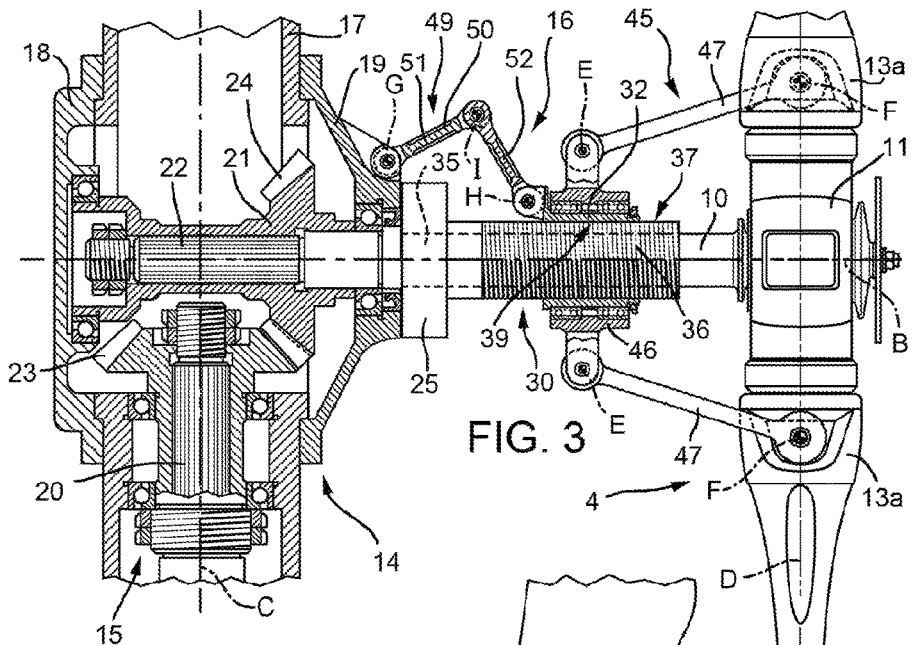
FIG. 3 shows a front view, with parts removed for clarity, of the FIG. 2 anti-torque rotor in a first operating position.

With reference to FIGS. 2 and 3, supporting body 14 comprises:
a body 17 extending predominantly along an axis C, which is crosswise to axes B, D;
a body 18 (FIG. 3) connected to body 17 and located on the opposite side of body 17 to blades 12; and
a body 19 connected to body 17 and located on the same side of body 17 as blades 12.

More specifically, drive 15 in turn comprises (FIGS. 3 and 4):
a drive shaft 20 which is supported by body 17 to rotate about axis C, and is connected operatively to the engine;
a shaft 21 which extends parallel to axis B, partly houses shaft 10, and is rotated integrally with shaft 10 by a splined coupling 22; and
a bevel gear interposed between shaft 20 and shaft 21, and defined by teeth 23 on shaft 20, and by teeth 24 on shaft 21 and meshing with teeth 23.

Actuator 16 advantageously comprises:
an electric motor 25 (only shown schematically in FIGS. 2 and 3) for generating torque along axis B; and
a mechanical stage 30 interposed between electric motor 25 and blades 12 to convert the torque generated by electric motor 25 to rotation of blades 12 about respective axes D; and electric motor 25 is located inside supporting body 14.

Electric motor 25 is thus integrated in anti-torque rotor 4.

The term 'mechanical stage' in the present description is intended to mean that electric motor 25 and blades 12 are connected to one another solely by mechanical parts, which transmit motion from one to another by mutual contact. In other words, no electric, pneumatic or hydraulic parts are interposed between electric motor 25 and blades 12.

More specifically, electric motor 25 comprises (FIGS. 2 and 5):
a stator 26 which is annular with respect to axis B;
a rotor 27 connected electrically to stator 26 and rotatable about axis B by an electric torque generated by stator 26; and
a housing 28 fixed to supporting body 14 and housing stator 26 and rotor 27.

In the example shown, rotor 27 is located radially inwards of stator 26 with reference to axis B.

In the example shown, electric motor 25 is a permanent magnet type.

More specifically, the permanent magnets are located on rotor 27, and stator 26 comprises direct-current windings.

In the FIG. 1-5 embodiment of the invention, housing 28 is fixed to body 19, on the opposite side to body 18, and projects from body 19 towards blades 12.

Advantageously, mechanical stage 30 comprises:
a shaft 31 which rotates about axis B and is connected operatively to rotor 27 of electric motor 25; and
a slide 32 which is annular with respect to axis B, slides parallel to axis B, and is connected operatively to shaft 31 and blades 12.

Shaft 31 extends along axis B and in turn comprises
a portion 35 connected to rotor 27 and angularly fixed with respect to axis B; and
a portion 36 which defines a threaded end surface 37 on the radially opposite side to axis B.

More specifically, portion 35 is located axially at the opposite end to blades 12, and portion 36 is located axially at the end facing blades 12.

Slide 32 extends along axis B and in turn comprises (FIG. 5):
an elongated annular main body 38 along axis B; and
a flange 41 projecting radially from main body 38, on the opposite side to axis B, and defining an axial end of slide 32 at the opposite end to blades 12.

More specifically, flange 41 is also annular with respect to axis B, and comprises a portion 42 projecting radially from one side only of axis B.

In other words, flange 41 is asymmetrical with respect to axis B.

Main body 38 is bounded, radially inwards with respect to axis B, by a threaded surface 39 which meshes with surface 37 of portion 36.

In other words, surface 37 of shaft 31 defines a screw which rotates about axis B, and surface 39 of slide 32 defines a nut screw screwed to said screw and movable along axis B.

More specifically, slide 32 is located radially outwards of shaft 31 with respect to axis B.

Shaft 31 is located radially outwards of shaft 10 with respect to axis B.

Rotor 4 also comprises two annular bearings 33, of axis B, interposed radially between shaft 10 and a surface 40, opposite surface 37, of shaft 31.

More specifically, surface 40 defines shaft 31 on the radially inner side with respect to axis B.

Bearings 33 thus allow shafts 31 and 10 to rotate about axis B at different angular speeds.

Actuator 16 also comprises a linkage 45 interposed between slide 32 and blades 12 to convert translation of slide 32 along axis B to rotation of blades 12 by the same angles about respective axes D.

More specifically, linkage 45 comprises:
a body 46 fitted to slide 32 and which rotates with respect to slide 32 about axis B; and
two levers 47 which are hinged to body 46 about respective axes E, and are hinged to roots 13a of respective blades 12 about respective axes F.

More specifically, body 46 is movable integrally with slide 32 in a direction parallel to axis B.

Body 46 is located radially outwards of slide 32 with respect to axis B.

Rotor 4 also comprises two bearings 48 (FIG. 5) interposed radially between body 46 and slide 32 to allow body 46 and slide 32 to rotate with respect to each other about axis B.

In the example shown, bearings 48 are annular rolling bearings coaxial with axis B.

Levers 47 are hinged to roots 13a eccentrically with respect to relative axes D.

In other words, axes F are eccentric with respect to relative axes D.

Translation of slide 32 (to the right or left in FIGS. 3, 4 and 5) along axis B thus rotates blades 12 about respective axes D.

Axes E are perpendicular to axes B and C.
Axes F are parallel to axes E and perpendicular to axes B and C.

Rotor 4 also comprises an antirotation device 49 for preventing slide 32 from rotating about axis B integrally with shaft 31.

Antirotation device 49 comprises a linkage 50 interposed between supporting body 14 and slide 32.

More specifically, linkage 50 is interposed between body 19 of supporting body 14 and portion 42 of slide 32.

More specifically, linkage 50 comprises:
a lever 51 hinged to body 19 of supporting body 14 about an axis G parallel to axis E; and
a lever 52 hinged to flange 41 about an axis H parallel to axes G and E, and hinged to lever 51 about an axis I parallel to axes G, E and H.

Axes G, H and I are parallel to axes E and F, and perpendicular to axes B and C.

Figure 7:
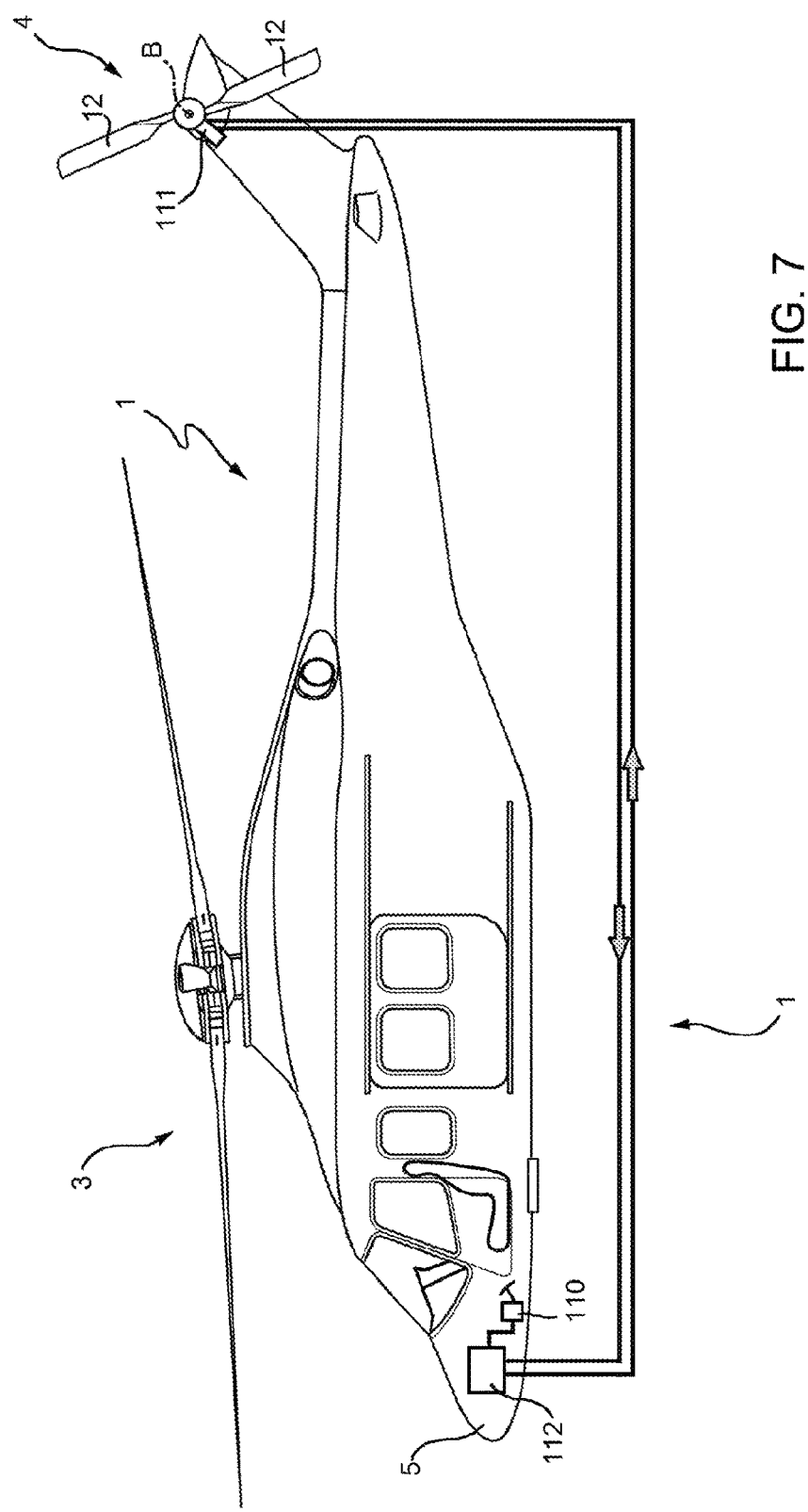
FIG. 7 shows in a lateral view further components of the helicopter of FIGS. 1.

Helicopter 1 further comprises (FIG. 7):
a plurality of pedals 110, which are arranged in fuselage 2 and can be actuated by a pilot;
a sensor 111, which is adapted to generate a signal associated to the position of slide 32 along axis B and, therefore, to the pitch angles of blades 2; and
a control unit 112, which is functionally connected to pedals 110, receives the signal from sensor 111 and generates a control signal for electric motor 25.

Sensor 111 can be, for example, a resolver or a LVDT sensor.

Electric motor 25 is driven, in the embodiment shown, by a main turbine of helicopter 1.

Alternatively, electric motor 25 could be fed with electrical energy by a group of batteries housed inside or externally to rotor 4, 4'.

In actual use, drive 15 rotates shaft 10 about axis B. Hub 11 and blades 12 rotate integrally with shaft 10 about axis B.

Shaft 10 rotates about axis B and in turn rotates hub 11 and blades 12 integrally about axis B.

When rotor 4 is running, actuator 16 can be operated to adjust the pitch angles of blades 12 with respect to the airflow and accordingly adjust the thrust generated by rotor 4.

More specifically, electric motor 25 produces torque to rotate shaft 31 about axis B. By virtue of threaded surface 37 of shaft 31 meshing with threaded surface 39 of slide 32, rotation of shaft 31 causes slide 32 to translate parallel to axis B.

Figure 4:
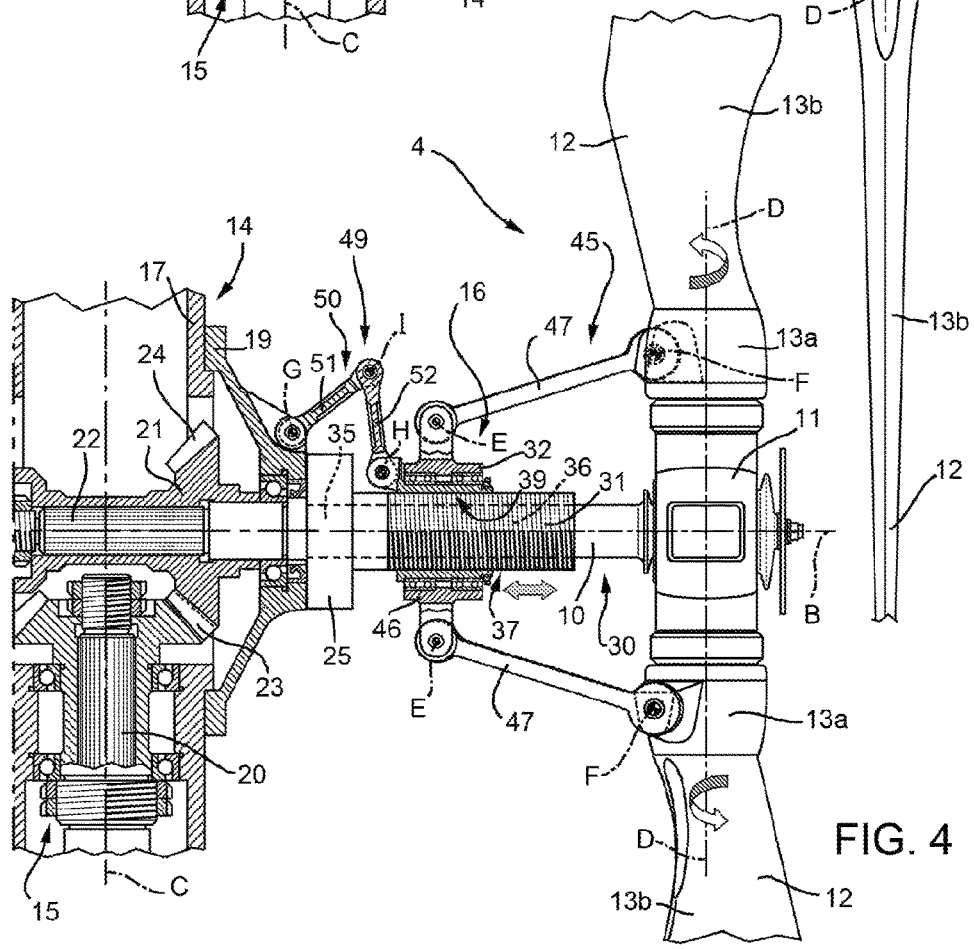
FIG. 4 shows a front view, with parts removed for clarity, of the FIG. 2 anti-torque rotor in a second operating position.
Figure 5:
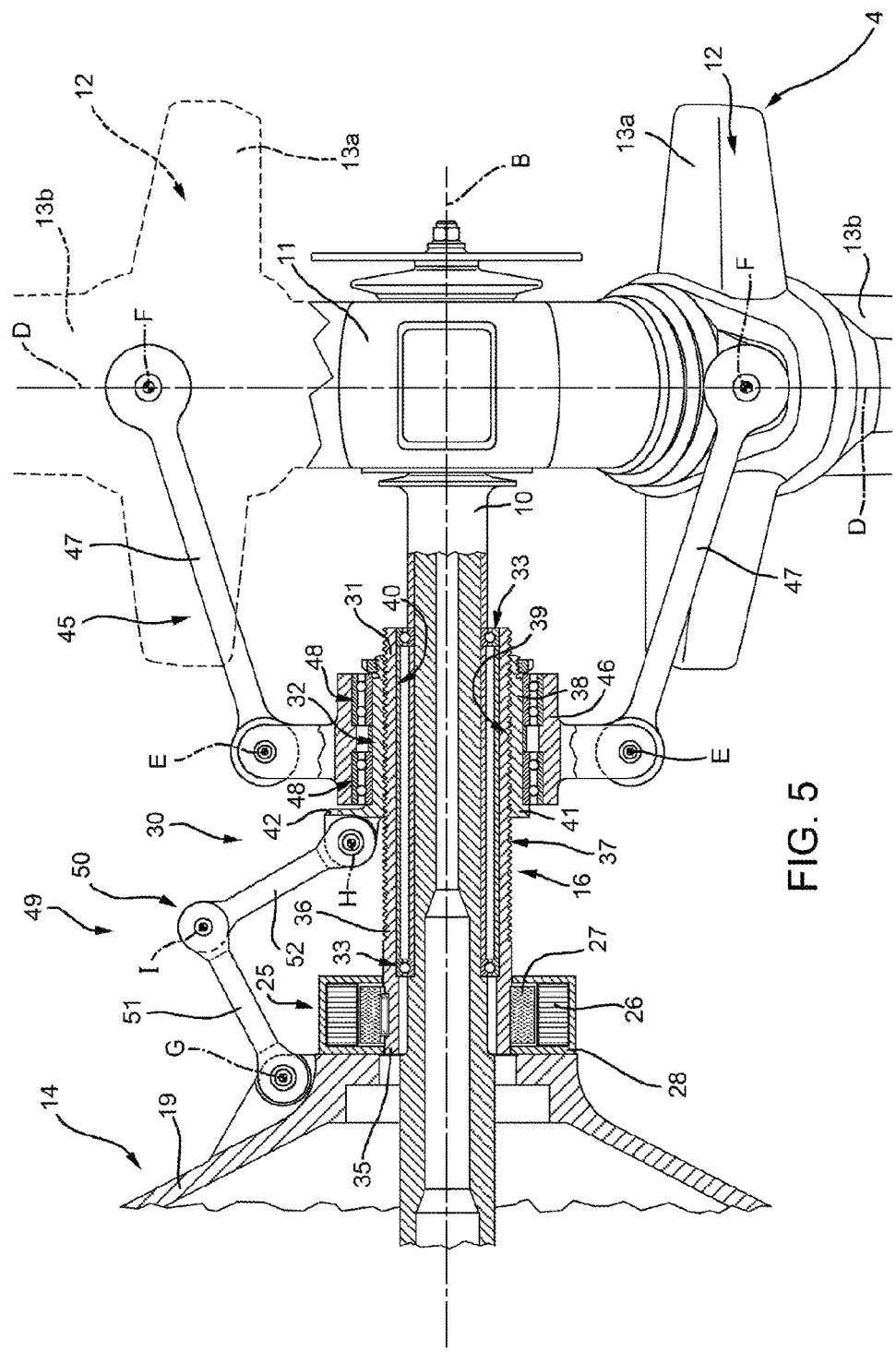
FIG. 5 shows a larger-scale cross section of the FIG. 2-4 anti-torque rotor.

Translation of slide 32 parallel to axis B produces a similar translation of body 46 of linkage 45 (FIGS. 3 and 4).

As shown in FIGS. 3 and 4, translation of body 46 parallel to axis B rotates levers 47 about axes E and F and adjusts the tilt of levers 47 with respect to axis B.

This tilt adjustment is the same for both levers 47 and, because axes F are eccentric with respect to axes D, rotates blades 12 by the same angles about axes D.

The pitch angles of blades 12 with respect to the airflow are thus adjusted.

Linkage 50 prevents slide 32 from rotating about axis B as slide 32 moves parallel to axis B.

Figure 6:
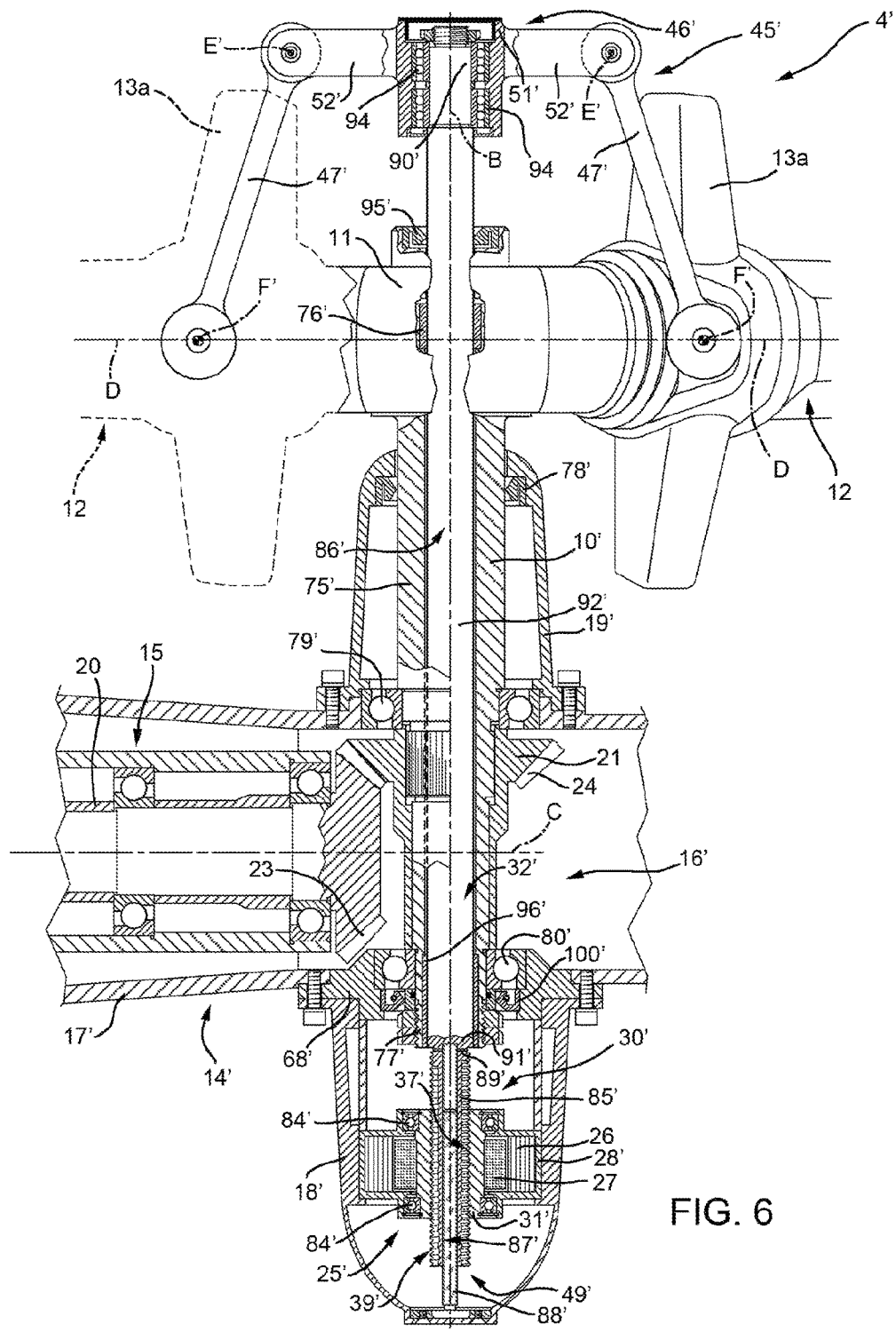
FIG. 6 shows a larger-scale cross section of a second embodiment of the anti-torque rotor according to the present invention.

Number 4' in FIG. 6 indicates as a whole an anti-torque rotor for a helicopter, which is in accordance with a different embodiment of the present invention. Rotor 4' is similar to rotor 4, and is described below only as regards the differences between the two; any corresponding or equivalent parts of rotors 4, 4' being indicated, where possible, using the same reference numbers.

Rotor 4' differs, in particular, from rotor 4 by electric motor 25' being housed inside supporting body 14'.

More specifically, supporting body 14' differs from supporting body 14 by bodies 19' and 18' being in the form of respective bells coaxial with axis B and tapering towards axis B from body 17' towards blades 12, and from body 17' away from blades 12 respectively.

Supporting body 14' also differs from supporting body 14 by comprising a flange 68' annular with respect to axis B and interposed between body 17' and body 18'.

Rotor 4' also differs from rotor 4 by electric motor 25' being housed inside body 18'.

Actuator 16' differs from actuator 16 by comprising a housing 28' fixed to body 18' and to which stator 26 is fixed.

Mechanical stage 30' differs from mechanical stage 30 by shaft 10' comprising:
- an axial end portion 76' fixed to hub 11;
- an axial end portion 77' opposite portion 76' and housed inside body 18'; and
- a main portion 75' housed partly inside body 17' and partly inside body 19'.

Rotor 4' also comprises:
- a seal 78' annular with respect to axis B and interposed radially between body 19' and portion 75' of shaft 10';
- a rolling bearing 79' annular with respect to axis B and interposed radially between portion 75' of shaft 10' and body 17'; and
- a rolling bearing 80' annular with respect to axis B and interposed radially between flange 68' and shaft 10'.

Mechanical stage 30' differs from mechanical stage 30 by threaded surface 37' defining shaft 31' radially inwards with respect to axis B, and by threaded surface 39' defining slide 32' radially outwards with respect to axis B.

In other words, shaft 31' defines a nut screw, and slide 32' a screw.

Shaft 31' differs from shaft 31 by being housed inside body 18'.

Mechanical stage 30' also differs from mechanical stage 30 by shaft 31' surrounding slide 32' coaxially.

Mechanical stage 30' also comprises two rolling bearings 84', each of which is annular with respect to axis B and interposed radially between housing 28' and a surface 39' of shaft 31' radially outwards with respect to axis B and radially opposite surface 37'.

Slide 32' differs from slide 32 by comprising:
- a tube 85' housed inside body 18' and defining threaded surface 39' screwed to threaded surface 37' of shaft 31'; and
- a rod 86' connected operatively to blades 12, at the opposite end to tube 85', to convert translation of rod 86' along axis B to rotation of blades 12 about respective axes D.

More specifically, rod 86' and tube 85' are integral with each other.

In the example shown, rod 86' is larger in diameter than tube 85'.

Tube 85' defines a prismatic seat 87' engaged by antirotation device 49' for preventing meshing threaded surfaces 37' and 39' from rotating slide 32' about axis B.

Antirotation device 49' comprises an elongated prismatic pin 88' extending along axis B and fixed to body 18'.

Tube 85' also comprises a number of radial holes 89' angularly spaced about axis B, located at the axial end of tube 85' facing rod 86', and designed to allow air out of shaft 31'.

Rod 86' in turn comprises:
- an axial end 90' connected operatively to blades 12 by linkage 45';
- an axial end 91' opposite axial end 90' and defining rod 86' at body 18'; and
- a main portion 92' interposed axially between axial ends 90' and 91' and extending loosely inside drive shaft 10' and hub 11.

Linkage 45' differs from linkage 45 by comprising:
- a body 46' fitted to rod 86', axially integral along axis B and movable angularly about axis B with respect to rod 86'; and
- two levers 47' hinged to body 46' about respective axes E', and to roots 13a of respective blades 12 about respective axes F'.

Body 46' in turn comprises:
- a tubular member 51' fitted to rod 86' and surrounding axial end 90' of rod 86'; and
- two arms 52' projecting from member 51' in respective directions radial and diametrically opposite with respect to axis B.

Levers 47' are hinged to respective arms 52' of body 46' about respective axes E', and to roots 13a of respective blades 12 about respective axes F'.

Mechanical stage 30' also comprises:
- two rolling bearings 94' which are annular with respect to axis B and interposed radially with respect to the axis B between member 51' and axial end 88' of rod 86';
- a seal 95' annular with respect to axis B and interposed radially between main portion 90' of rod 86' and hub 11; and
- a bushing 96' interposed radially between main portion 90' of rod 86' and drive shaft 10'; and
- an annular seal 100', of axis B, adjacent to bearing 80' and for fluidtight sealing body 18' from bodies 17' and 19'.

Operation of rotor 4' is similar to that of rotor 4, and is described below only as regards the differences between the two.

More specifically, electric motor 25' rotates shaft 31' about axis B.

By virtue of threaded surface 37' of shaft 31' meshing with threaded surface 39' of tube 85', rotation of shaft 31' causes tube 85' and rod 86' s a whole to translate parallel to axis B.

Pin 88' prevents tube 85' and rod 86' from rotating about axis B.

Translation of rod 86' along axis B produces a similar translation of body 46' parallel to axis B, and rotates levers 47' about respective hinge axes E' and F'.

Rotation of levers 47' about respective axes F' rotates blades 12 by the same angles about respective axes D.

The pitch angles of blades 12 and therefore also the thrust exerted by rotor 4' are thus adjusted.

Bearings 94' allow body 46' to rotate about axis B with respect to rod 86'.

The advantages of helicopter 1 according to the present invention will be clear from the above description.

More specifically, electric motor 25, 25' is fixed to supporting body 14, 14' of rotor 4, 4', and connected to blades 12 by a mechanical stage 30, 30'.

As such, actuator 16, 16' is fully integrated in rotor 4, 4' and only employs 'contacting' mechanical parts to transmit motion from electric motor 25, 25' to blades 12.

Actuator 16, 16' therefore has no parts housed inside fuselage 2.

Rotor 4, 4' is therefore much easier to produce, assemble and maintain.

By virtue of electric motor 25, 25' being connected to blades 12 by a mechanical stage 30, 30', rotor 4, 4' provides for highly precise, repeatable pitch angle adjustment of blades 12.

In fact, the speed and acceleration of slide 32, 32' are determined solely by the connection to shaft 31, 31', and are substantially unaffected by uncontrollable external parameters.

Moreover, electric motor 25, 25' and mechanical stage 30, 30' require no pressurized oil or other pressurized fluids, and so prolong the working life of rotor 4, 4' as compared with known anti-torque rotors.

Actuator 16, 16' comprises a shaft 31, 31' and slide 32, 32' with respective threaded surfaces 37, 37' and 39, 39' meshing with each other.

As such, movement of slide 32, 32' along axis B and therefore adjustment of the pitch angles of blades 12 are extremely precise.

Antirotation devices 49, 49' allow slides 32, 32' to translate along, but not rotate about, axis B.

Rotor 4' is particularly advantageous by electric motor 25' and threaded surfaces 37', 39' being housed inside supporting body 14'.

This prevents dirt, such as dust, from damaging the threads of surfaces 37', 39' and so impairing adjustment of the pitch angles of blades 12.

Clearly, changes may be made to helicopter 1 as described and illustrated herein without, however departing from the protective scope defined in the accompanying Claims.

More specifically, rotor 4, 4' may be a rigid or articulated anti-torque rotor, or a so-called 'fenestron' rotor integrated in the tail beam of fuselage 2.

I claim:

1. A helicopter (1) comprising:
a fuselage (2) with a nose (5);
a main rotor (3) fitted to the top of said fuselage (2); and
an anti-torque rotor (4) fitted to said fuselage (2) on the opposite side of said nose (5);
said anti-torque rotor (4) comprising:
a supporting body (14);
a drive shaft (10) which rotates about a first axis (B) with respect to said supporting body (14);
a hub (11) connected operatively to said drive shaft (10) and angularly rotatable together with said drive shaft (10) about said first axis (B);
at least one pair of blades (12) which are connected operatively to said hub (11), are angularly rotatable together with said hub (11) about said first axis (B), and are angularly rotatable about a second axis (D) and with respect to said hub (11) to adjust the pitch angles of said blades (12); and
an actuator (16) which can be operated to rotate said blades (12) about said second axis (D) to adjust the pitch angle of said blade (12);
said actuator (16) in turn comprising:
an electric motor (25) which generates torque along said first axis (B); and
a mechanical stage (30) designed to convert said torque into rotation of said blades (12) about the respective second axes (D);
a single said mechanical stage being interposed between said electric motor (25) and said at least two blades (12);
said single mechanical stage (30) comprising:
a rotary member (31) which rotates about said first axis (B), and is rotated about said first axis (B) by said electric motor (25); and
a sliding member (32) which translates along said first axis (B), is fitted to said rotary member (31), and to which said at least two blades (12) are hinged;
characterized in that said electric motor (25) is fixed to said supporting body (14);
said electric motor (25) comprising:
a stator (26) which is annular with respect to said first axis (B);
a rotor (27) connected electrically to said stator (26) and rotatable about said first axis (B) by an electric torque generated by stator (26); and
a housing (28) fixed to and projecting from said supporting body (14) and housing said stator (26) and rotor (27);
said electric motor (25) being arranged outside said fuselage (2) and external with respect to said drive shaft (10), said blades (12) and to said hub (11);
said rotary member (31) defining a first threaded surface (37), and said sliding member (32) defining a second threaded surface (39) which meshes with said first threaded surface (37).

2. A helicopter as claimed in claim 1, characterized by comprising at least one linkage (45) interposed between said sliding member (32) and a relative said blade (12);
said linkage (45) in turn comprising at least one first lever (47) hinged to said blade (12) eccentrically with respect to the respective said second axis (D), and hinged to said sliding member (32).

3. A helicopter as claimed in claim 1, characterized by comprising an anti-rotation device (49) which is fitted to said supporting body (14), is connected operatively to said sliding member (32), and is designed to prevent rotation of said sliding member (32) as said rotary member (31) rotates.

4. A helicopter as claimed in claim 3, characterized in that said antirotation device (49) comprises:
a second lever (51) hinged to said sliding member (32); and
a third lever (52) hinged to said second lever (51) and to said supporting body (14).

5. A helicopter as claimed in claim 3, characterized in that said antirotation device (49) is located on one side of said first axis (B).

6. A helicopter as claimed in claim 1, characterized in that at least part of said drive shaft (10) is housed inside at least part of said rotary member (31).

* * * * *